(12) United States Patent
Kobayashi et al.

(10) Patent No.: US 8,082,469 B2
(45) Date of Patent: Dec. 20, 2011

(54) VIRTUAL COMPUTER SYSTEM, ERROR RECOVERY METHOD IN VIRTUAL COMPUTER SYSTEM, AND VIRTUAL COMPUTER CONTROL PROGRAM

(75) Inventors: Takashi Kobayashi, Atsugi (JP); Akira Takeshita, Hadano (JP); Mitsuo Yamamoto, Ebina (JP); Hiromi Nagashima, Yamato (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 12/507,516

(22) Filed: Jul. 22, 2009

(65) Prior Publication Data

US 2010/0037097 A1 Feb. 11, 2010

(30) Foreign Application Priority Data

Aug. 7, 2008 (JP) ................................. 2008-203968

(51) Int. Cl.
*G06F 11/00* (2006.01)
(52) U.S. Cl. ......................................................... 714/23
(58) Field of Classification Search .................. 714/1–3, 714/4.11, 4.2, 4.3, 6.12, 6.13, 6.3, 6.32, 10–12, 714/14–17, 18, 23, 31, 32, 37, 38.1
See application file for complete search history.

(56) References Cited

U.S. PATENT DOCUMENTS

| 5,381,544 | A | * | 1/1995 | Okazawa et al. ............. 714/5.11 |
| 5,805,790 | A | * | 9/1998 | Nota et al. ....................... 714/10 |
| 6,014,756 | A | * | 1/2000 | Dottling et al. .................. 714/15 |
| 7,493,515 | B2 | * | 2/2009 | Armstrong et al. ............. 714/10 |
| 7,549,090 | B2 | * | 6/2009 | Bailey et al. ..................... 714/43 |
| 2002/0162049 | A1 | * | 10/2002 | Takamoto et al. .............. 714/12 |
| 2004/0221200 | A1 | * | 11/2004 | Armstrong et al. ............. 714/30 |
| 2009/0276783 | A1 | * | 11/2009 | Johnson et al. ............... 718/104 |

FOREIGN PATENT DOCUMENTS

| JP | 63-269233 | 11/1988 |
| JP | 01-112599 | 5/1989 |
| JP | 06-052049 | 2/1994 |
| JP | 08-194648 | 7/1996 |

* cited by examiner

*Primary Examiner* — Nadeem Iqbal
(74) *Attorney, Agent, or Firm* — Foley & Lardner LLP

(57) ABSTRACT

A virtual computer system executes a virtual computer control program on a physical computer and thereby causes guest programs on the logical partitions, respectively. The virtual computer control program includes an error recovery module to periodically recover from an error in a cache memory, an error interruption handler module responsive to an interruption notice caused by an error which has occurred in the cache memory, to recover from an error in the cache memory, and an error data initialization module to recover from an error in the cache memory with shutdown or restart of one of the logical partitions as a momentum. And the virtual computer control program conducts recovery processing from an error in the cache memory.

5 Claims, 12 Drawing Sheets

FIG.7
(a) AT TIME OF EXECUTION OF STEP S406
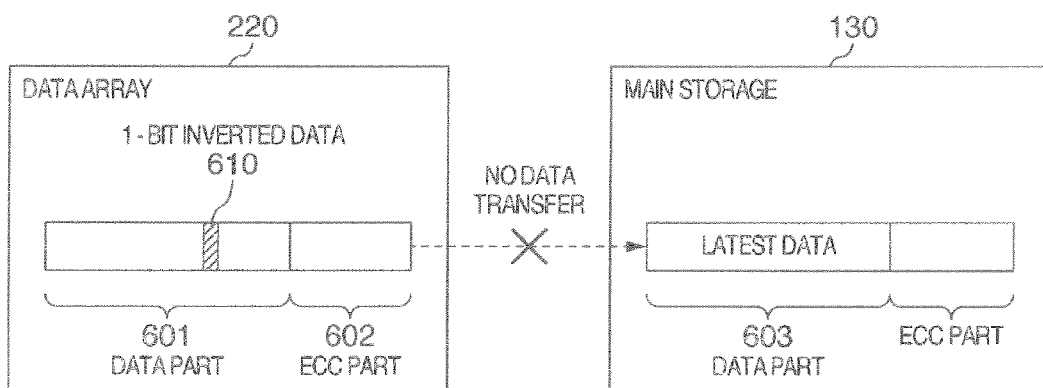
(b) AT TIME OF EXECUTION OF STEP S407
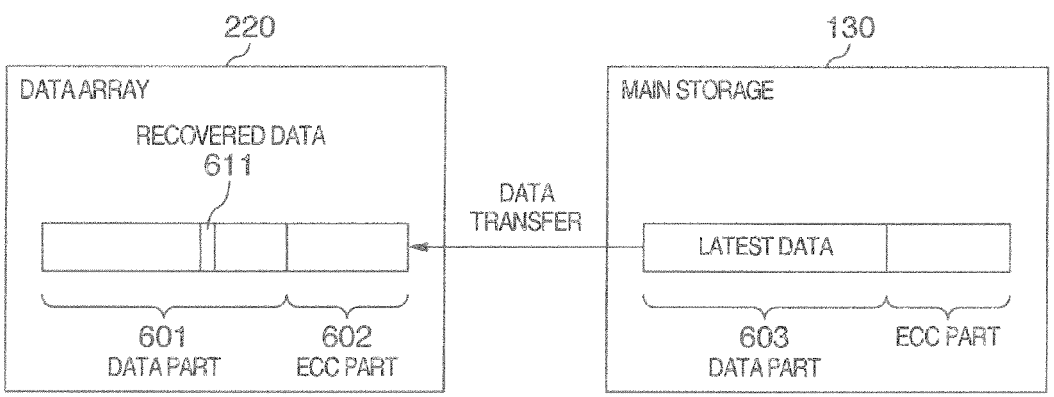

FIG.8
(a) AT TIME OF EXECUTION OF STEP S406
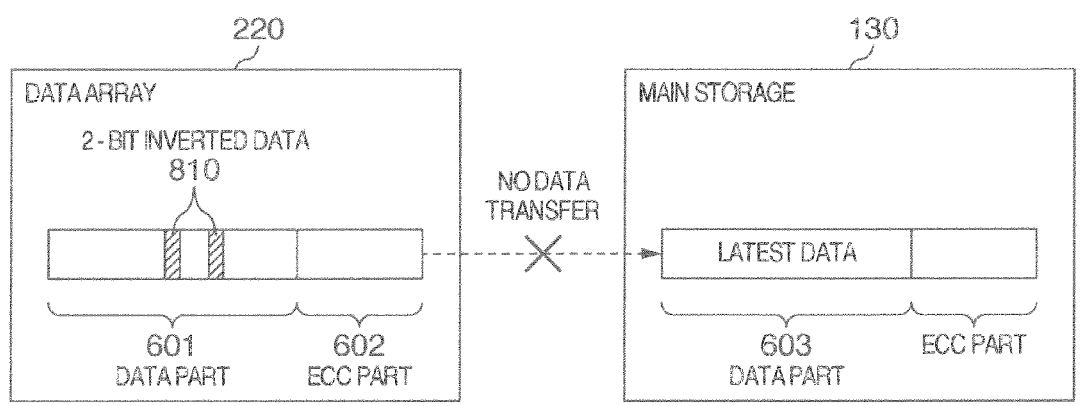
(b) AT TIME OF EXECUTION OF STEP S407
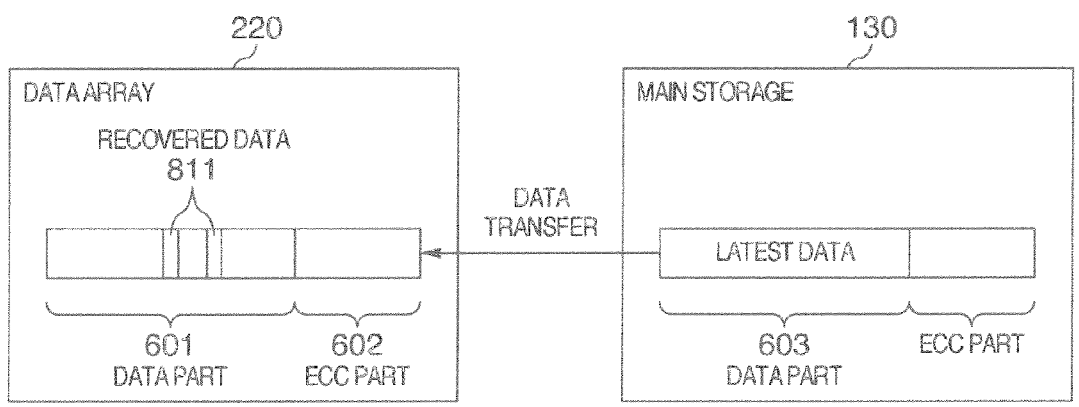

FIG.9
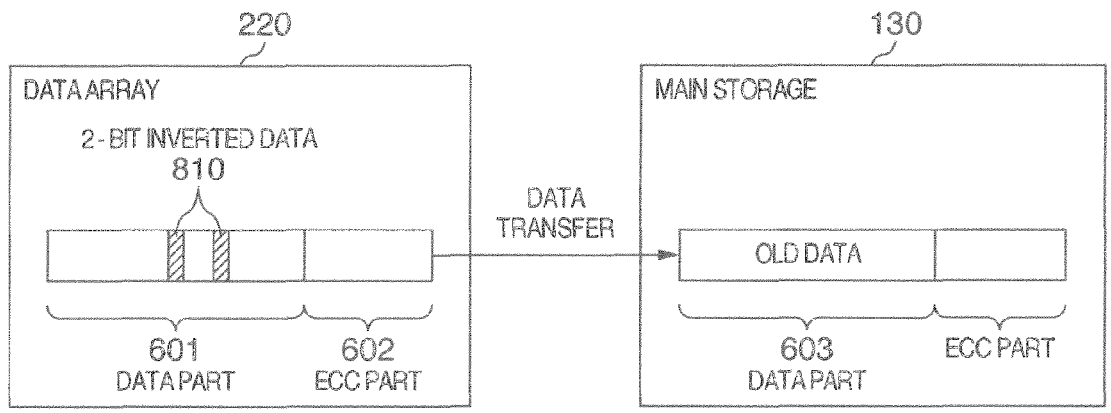
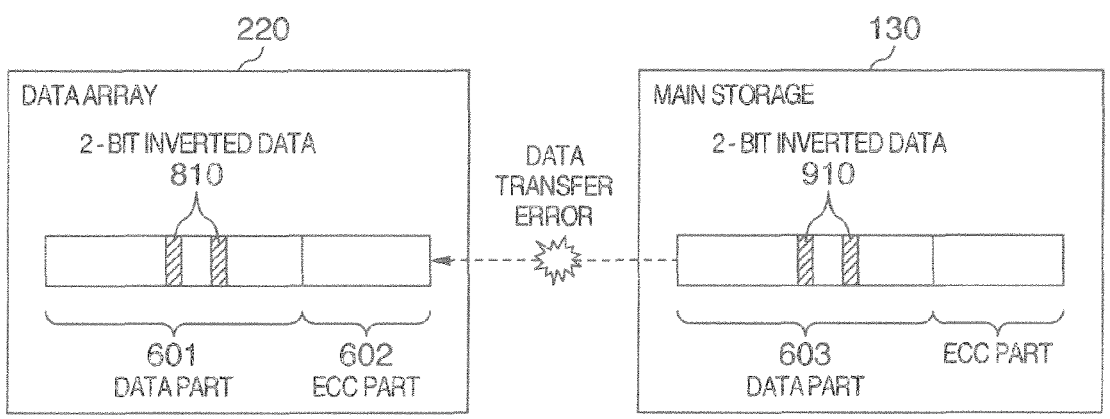

FIG. 13
(a) AT TIME OF EXECUTION OF STEP S407
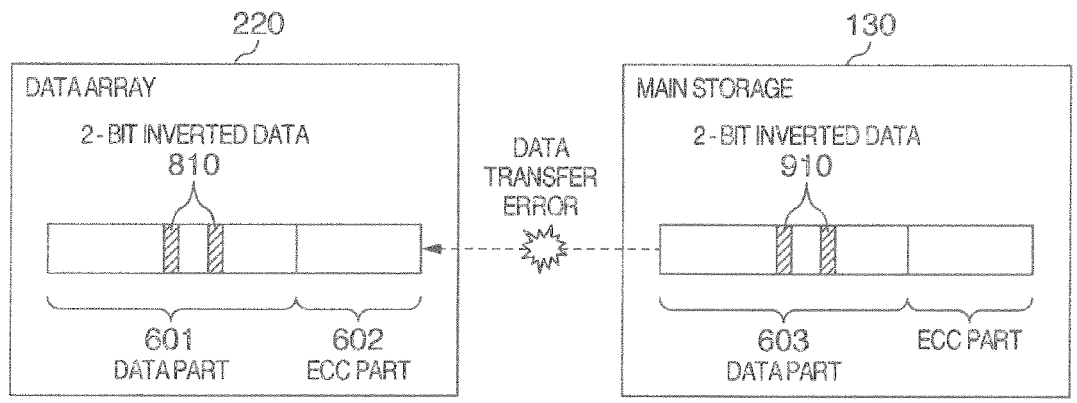
(b) AT TIME OF EXECUTION OF STEP S1007 OR S1203
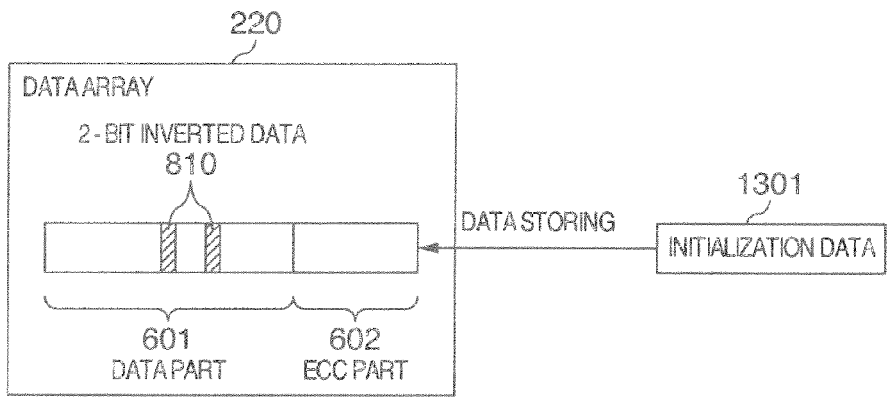
(c) AT TIME OF EXECUTION OF STEP S1008 OR S1204
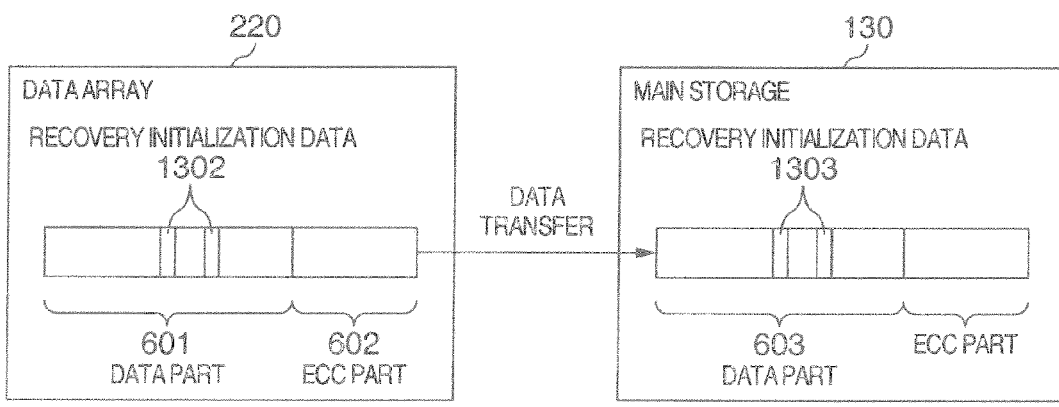

VIRTUAL COMPUTER SYSTEM, ERROR RECOVERY METHOD IN VIRTUAL COMPUTER SYSTEM, AND VIRTUAL COMPUTER CONTROL PROGRAM

INCORPORATION BY REFERENCE

The present application claims priority from Japanese application JP2008-203968 filed on Aug. 7, 2008, the content of which is hereby incorporated by reference into this application.

BACKGROUND OF THE INVENTION

The present invention relates to an error recovery technique in a virtual computer system, and in particular to a technique which is effective to application to an error recovery technique in a cache memory.

As a conventional technique making it possible to operate OSs (operating systems) which have operated separately in a plurality of physical computers and software programs which operate on the OSs, by using one physical computer, there is the virtual computer technique.

In the virtual computer technique, for example, a virtual computer control program called hypervisor logically divides one physical computer into a plurality of logical partitions. The virtual computer control program assigns computer resources (a CPU (central processing unit), a main storage and an I/O (input/output device) to each of logical partitions obtained by the division. An OS (guest OS) operates on the logical partition under the control of the virtual computer control program.

This virtual computer technique is a technique which has heretofore been used in large-sized computers such as general purpose computers (main frames). Owing to the performance improvement of microprocessors in recent years, however, the virtual computer technique has begun to be applied to low-end PC servers as well. It can be said that applying such low-end PC servers to mission critical servers used in enterprise business or the like is advantageous in reducing the cost and has great needs.

On the other hand, with the internationalization of the enterprise business and the globalization of computer networks represented by Internet for a background, the necessity for long time continuous operation (operation for 24 hours on 365 days) of the computer system is becoming high. As a mater of course, this necessity also holds true for the case where a virtual computer system using a low-end PC server is used.

Speaking of large capacity memory in the conventional computer system, the main storage is the main stream and the occurrence probability of main storage errors is high in proportion to the increased capacity of the main storage. As the capacity of a cache memory used to improve the performance of access to main storage data from a CPU becomes large, however, the occurrence probability of cache memory errors tends to be high in recent years.

As the capacity of the cache memory becomes large, the probability that data will stay in the cache memory long becomes high and the cases where the latest data exists in only the cache memory also increase. For implementing the long time continuous operation in the virtual computer system, therefore, a technique for continuously operating the system not only at the time of occurrence of a main storage error but also at the time of a cache memory error becomes very important.

As regards the error recovery in the memory, various techniques have been proposed heretofore. For example, according to a technique disclosed in JP-A-6-52049 (Patent Document 1), contents in the main memory are recovered by managing data accessed since the start to end of processing which is being executed in the processor, in the cache memory as an intermediate state, writing back contents of a block before rewriting to the main memory, rewriting only a block stored in the cache memory when rewriting to a block in the intermediate state, and invalidating only a rewritten block on the cache memory when suspending processing which is being executed.

As a memory error recovery technique other than the above-described error recovery technique, an apparatus for periodically conducting error check on all data stored in the memory, apart from access to the memory conducted by the processor is proposed. In other words, a memory scrubbing method for conducting error check sequentially on all data periodically for a RAM (Random Access Memory) chip is used apart from the memory access from the processor. As the technique relating to the memory scrubbing method, there is, for example, a technique described in JP-A-8-194648 (Patent Document 2).

If an error is found in data by conducting this error check, then data codes of all addresses of a line on which the error has occurred are taken out from a RAM chip one by one, and subject to ECC (Error Correcting Code) check. If an error can be corrected, the data error is corrected. As techniques relating to this, for example, techniques disclosed in JP-A-1-112599 (Patent Document 3) and JP-A-63-269233 (Patent Document 4) can be mentioned.

SUMMARY OF THE INVENTION

According to the technique disclosed in Patent Document 1 (JP-A-6-52049), contents of the main memory are recovered by invalidating only a rewritten block on the cache memory. Therefore, it can be said that it is not easy to apply the technique to the cache memory for recovery from a cache memory error.

In the memory scrubbing technique used in Patent Document 2 (JP-A-8-194648), it is typically necessary to provide dedicated hardware in order to maintain the consistency of memory data at the time of competition with memory access conducted by the processor. Or a technique such as exclusive control of memory access exercised by software is needed. If the object is a cache memory, a unit for scrubbing the cache memory becomes necessary in addition.

However, it is not desirable in the cost aspect to add hardware for implementing recovery from a cache memory error in, for example, a virtual computer system which can be applied to low-end PC servers as well.

The virtual computer system is a system that a plurality of various kinds of guest programs (guest OSs and guest applications) operate on a plurality of logical partitions. As for recovery from a cache memory error conducted by software as well, therefore, it is not real and desirable to request all of these guest programs to mount a cache memory error recovery function enough to achieve the long time continuous drive.

Therefore, an object of the present invention is to provide a virtual computer system and an error recovery method which make it possible to recover from a cache memory error without needing to add hardware and mounting an error recovery unit on a guest program, and a virtual computer control program which implements this method. The object and other objects and novel features of the present invention will be elucidated from the following description and accompanying drawings.

Hereafter, outlines of representative aspects of the present invention disclosed herein will be described briefly.

A virtual computer system according to a representative embodiment of the present invention is a virtual computer system for executing a virtual computer control program on a physical computer to divide the physical computer to a plurality of logical partitions, assign computer resources of the physical computer to the logical partitions and control the computer resources, and thereby causing guest programs respectively including guest OSs to operate on the logical partitions, respectively, wherein the virtual computer control program includes an error recovery module for periodically conducting error recovery processing to recover from an error in a cache memory in the physical computer, an error interruption handler module responsive to an interruption notice caused by an error which has occurred in the cache memory, for conducting error interruption processing to recover from an error in the cache memory, and an error data initialization module for conducting error data initialization processing to recover from an error in the cache memory with shutdown or restart of one of the logical partitions as a momentum, and the recovery processing from an error in the cache memory is conducted independently of operations of the guest programs operating on the logical partitions.

Hereafter, effects obtained by representative aspects of the present invention disclosed herein will be described briefly.

According to representative embodiments of the present invention, a high reliability system which makes long time continuous operation possible even if a cache memory error occurs can be provided in a virtual computer system. Furthermore, it is possible to provide a low-cost secure cache memory error recovery function without needing to add hardware and mount an error recovery unit on a guest program, by providing an error recovery function for the cache memory in the virtual computer control program.

Other objects, features and advantages of the invention will become apparent from the following description of the embodiments of the invention taken in conjunction with the accompanying drawings.

BRIEF DESCRIPTION OF THE DRAWINGS

FIG. 7 shows diagrams for explaining an example of error recovery processing conducted by an error recovery module in an embodiment of the present invention;

FIG. 8 shows diagrams for explaining an example of error recovery processing conducted by an error recovery module in an embodiment of the present invention;

FIG. 9 shows diagrams for explaining an example of error recovery processing conducted by an error recovery module in an embodiment of the present invention;

FIG. 13 shows diagrams for explaining an example of error recovery processing conducted by an error recovery module in an embodiment of the present invention.

DESCRIPTION OF THE EMBODIMENTS

Hereafter, embodiments of the present invention will be described in detail with reference to the drawings. Throughout all drawings for explaining the embodiments, the same parts are denoted by like characters in principle and duplicated description thereof will be omitted.

<Cache Memory>

The cache memory is a fast memory used in a fast processor (CPU) to improve the performance of access to data in a main storage from the CPU. Hereafter, an example of operation of a typical cache memory will be described.

Figure 2:
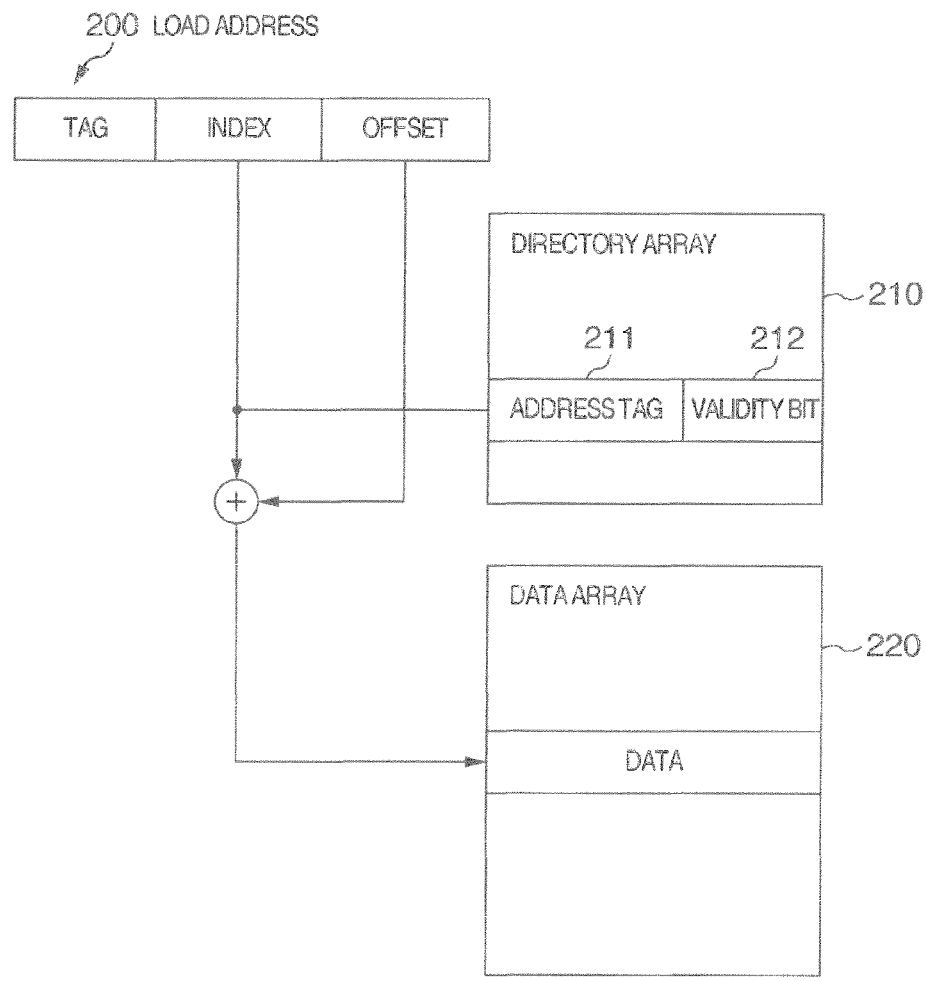
FIG. 2 is a block diagram for explaining an example of operation of a typical cache memory.

FIG. 2 is a block diagram for explaining an example of operation of a typical cache memory. Upon issuance of a data load request from an instruction control unit in a CPU which is not illustrated, a cache memory receives a request and a load address 200. The load address 200 is divided into three parts, i.e., a tag address, an index address and an offset address.

The cache memory first refers to the index address and reads out a corresponding entry in a directory array 210. A validity bit 212 is stored in an entry of the directory array 210 together with an address tag 211. If the validity bit 212 of the entry read out from the directory array 210 is ON (effective), then the cache memory compares the address tag 211 (hereafter referred to as registered tag) of the entry read out from the directory array 210 with the tag address (hereafter referred to as received tag) received from the instruction control unit in the CPU.

If the received tag coincides with the registered tag registered in the pertinent entry in the directory array 210, then the cache memory concatenates the index address and the offset address received from the instruction control unit in the CPU by addition, and generates an entry address of a data array 220. Thereafter, the cache memory reads out data referenced by the entry address (data which is the same as data in the main storage) from the data array 220, and delivers the data to a computation unit in the CPU which is not illustrated.

If the received tag does not coincide with the registered tag registered in the directory array 210, then the cache memory judges that it does not retain a copy of corresponding data (the latest data) in the main storage and sends a data load request to a control unit in the main storage which is not illustrated. Upon receiving requested data from the control unit in the main storage, the cache memory turns ON the validity bit 212 of the pertinent entry in the directory array 210 and writes the address tag 211. Furthermore, the cache memory writes data delivered from the main storage into the corresponding entry in the data array 220, and delivers data to a computation unit in the CPU. Also in the case where the validity bit 212 of the entry read out from the directory array 210 is OFF (invalid), the cache memory judges that it does not retain the copy of the corresponding data (the latest data) in the main storage and conducts operation similar to the above-described operation.

The cache memory takes a continuous address region having a predetermined size as the unit of data management. Information of every data management unit is registered in each entry of the directory array 210. Hereafter, the data management unit in the cache memory is referred to as line for convenience in some cases. In general, data transfer between the cache memory and the main storage is conducted by taking a line as the unit.

Heretofore, an example of operation of a typical cache memory has been described. In general, there are cache memories implemented by operation other than the operation described above.

Embodiment

Figure 1:
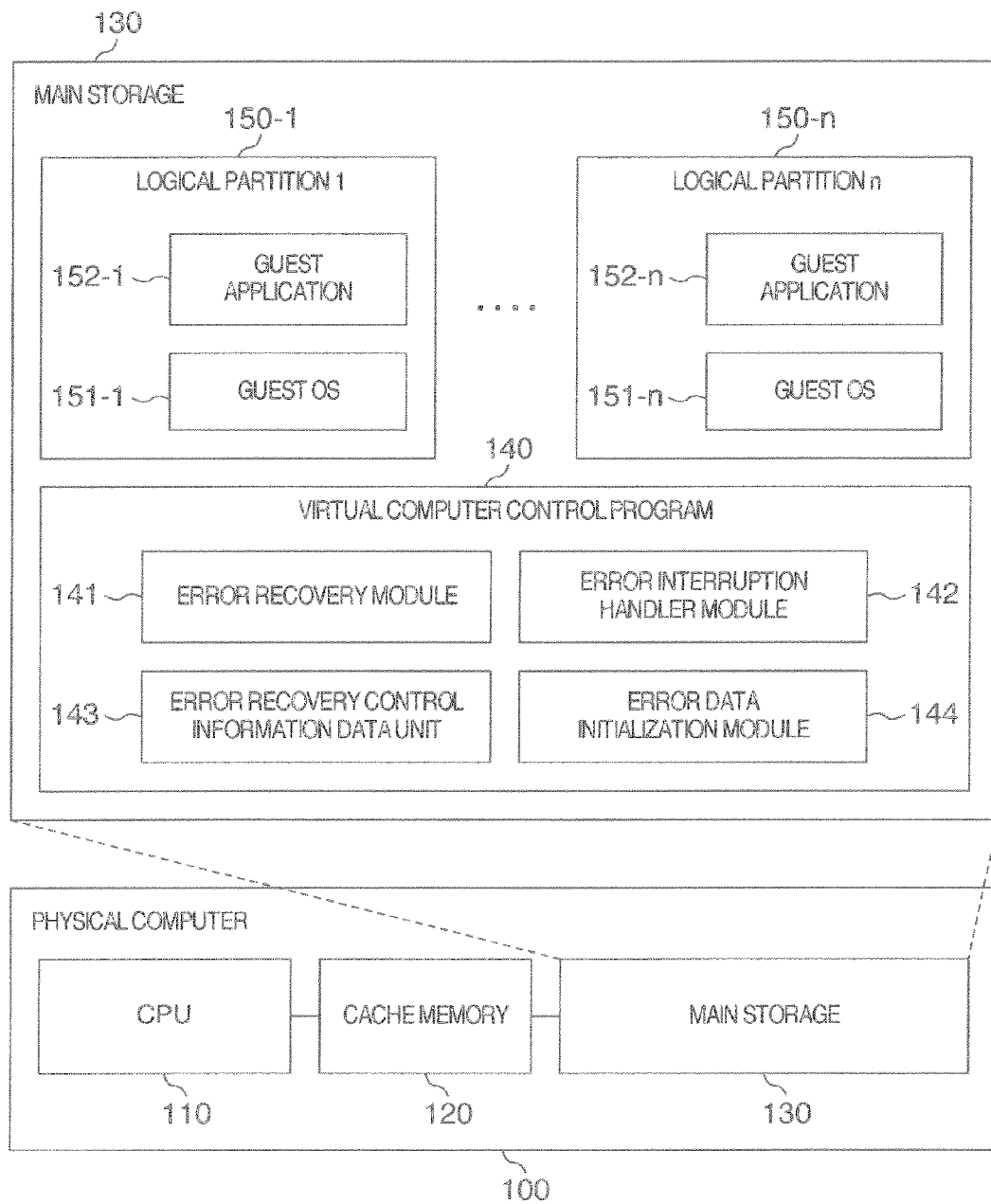
FIG. 1 is a block diagram showing an example of a virtual computer system which is an embodiment of the present invention.

Hereafter, a virtual computer system which is an embodiment of the present invention will be described. FIG. 1 is a block diagram showing an example of a virtual computer system which is an embodiment of the present invention.

In one physical computer 100 in the virtual computer system according to the present embodiment, a virtual computer control program 140 constitutes a plurality of logical partitions 150 (150-1 to 150-n). In each of the logical partitions 150, a guest OS 151 (151-1 to 151-n) and a guest application 152 (152-1 to 152-n) can operate (hereafter, the guest OS 151 and the guest application 152 are referred to collectively as guest program in some cases). In other words, a virtual computer system in which guest programs can operate in the logical partitions 150 under the control of the virtual computer control program 140 is constituted in the physical computer 100.

The physical computer 100 includes a CPU 110, a main storage 130, and a cache memory 120. The CPU 110 executes various kinds of processing of the physical computer 100. Furthermore, the CPU 110 reads out a program stored in the main storage 130, and executes processing prescribed in the program. The main storage 130 stores various programs such as the virtual computer control program 140 and data described later.

The cache memory 120 is a memory for storing a copy of data in the main storage 130. The cache memory 120 stores data read from the main storage 130. The cache memory 120 is formed so as to include the directory array 210 and the data array 220 described earlier and shown in FIG. 2. An example of typical operation of the cache memory 120 has been described earlier with reference to FIG. 2.

It is supposed that software is provided with a unit for reading out data from the directory array 210 in the cache memory 120 and a unit (invalidation unit) for turning OFF the validity bit 212. As a result, it is possible to read out data in the directory array 210 from the software and turn OFF (invalid) the validity bit 212.

The virtual computer control program 140 will now be described. The virtual computer control program 140 is a hypervisor (typically called firmware) which logically divides hardware resources (computer resources) of the physical computer 100 and manages resultant partitions as logical partitions 150. In other words, the virtual computer control program 140 logically divides computer resources such as the CPU 110 and the main storage 130 in the physical computer 100 and assigns the resources thus obtained by division as the logical partitions 150.

In each logical partition 150, the logically divided CPU 110 operates as a virtual CPU, and executes an OS (a guest OS 151) and a program (a guest application 152). The virtual computer control program 140 includes a unit for stopping and resuming the guest programs in order to make it possible to control the OS and program. By the way, the number of the logical partitions can be set by various methods. For example, according to a method, an arbitrary number is set by a manager or the like.

The virtual computer control program 140 includes an error recovery module 141, an error interruption handler module 142, and an error data initialization module 144. The virtual computer control program 140 further includes an error recovery control information data unit 143 as a data group to be used by these modules.

The error recovery module 141 is a module for conducting error recovery processing to recover from errors in the cache memory 120 periodically. The error interruption handler module 142 is a module responsive to an interruption notice based on an error which has occurred in the cache memory 120 by conducting error interruption processing to recover from the error in the cache memory 120 and conduct handling. The error data initialization module 144 is a module for conducting error data initialization processing to initialize data in the cache memory 120 and recover from an error at the time of shutdown or restart of the logical partition.

Figure 3:
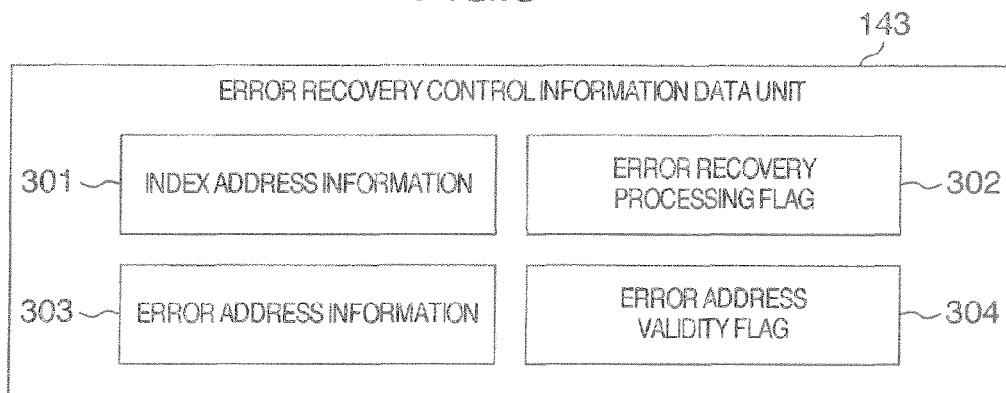
FIG. 3 is a diagram showing an example of information retained in an error recovery control information data unit in an embodiment of the present invention.

FIG. 3 is a diagram showing an example of information retained in the error recovery control information data unit 143. Index address information 301 retains a value of an index address to be used by the error recovery module 141 or the like to access the cache memory 120. The index address information 301 is initialized with a value of the index address corresponding to a head entry of the directory array 210 in the initialization processing of the virtual computer control program 140.

An error recovery processing flag 302 is a flag which indicates that the error recovery module 141 is conducting processing. The error recovery processing flag 302 is initialized with OFF in the initialization processing of the virtual computer control program 140. Error address information 303 is used by the error interruption handler module 142 or the like to retain an error address on the cache memory 120. An error address validity flag 304 is a flag which indicates whether the error address information 303 is valid. The error address validity flag 304 is initialized with OFF in the initialization processing of the virtual computer control program 140.

Figure 4:
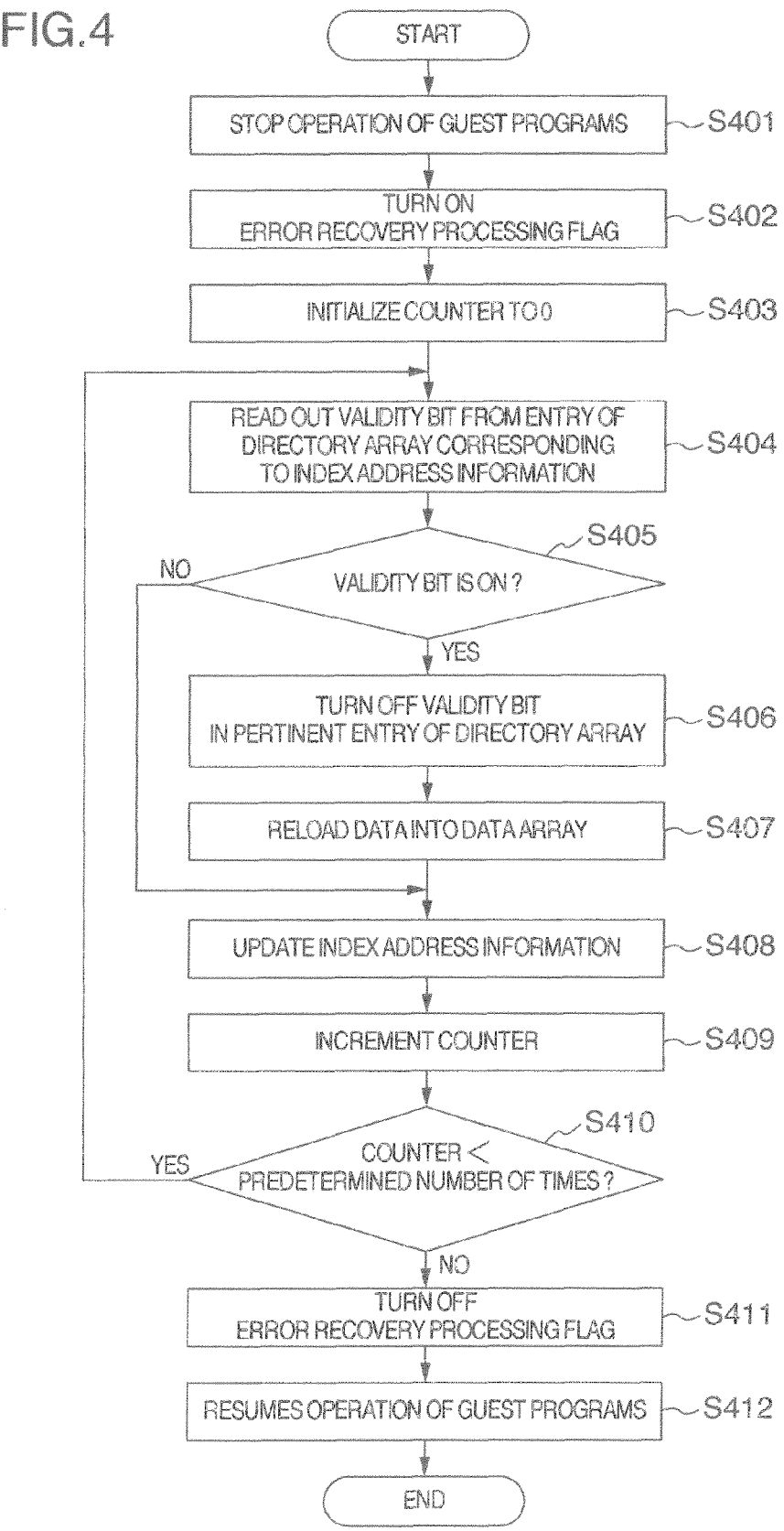
FIG. 4 is a flow chart showing an example of error recovery processing conducted by an error recovery module in an embodiment of the present invention.

FIG. 4 is a flow chart showing an example of error recovery processing conducted by the error recovery module 141. In the error recovery processing, operation of all guest programs are first stopped (S401). This is processing for making it possible to stop access to the cache memory 120 from a guest program and for the error recovery module 141 to conduct error recovery during that time.

Subsequently, the error recovery processing flag 302 is turned ON (S402). This flag is used in processing of the error interruption handler module 142 to make a decision whether the object error interruption is an error interruption which has occurred during the processing of the error recovery module 141. Subsequently, the counter is initialized to 0 (S403). Subsequently, the index address retained in the index address information 301 is read out. In the cache memory 120, the validity bit 212 is read out from an entry of the directory array 210 corresponding to the index address thus read out (S404).

Subsequently, a decision is made whether the validity bit 212 read out is ON (valid) (S405). If the validity bit 212 is ON, then the cache memory 120 is ordered to turn the validity bit 212 OFF (invalid) and invalidate the pertinent entry of the directory array 210 (S406). If only data in the data array 220 corresponding to the entry in the directory array 210 to be invalidated is in a state in which the latest data is retained, then the latest data is transferred to a memory of the next hierarchical level (the main storage 130 in the case of the configuration example shown in FIG. 1) and it is ensured that the latest data will not be lost, owing to typical operation of the cache memory 120 conducted when such invalidation has been executed.

Subsequently, the error recovery module 141 reloads data into a data part in the data array 220 corresponding to the entry in the directory array 210 invalidated at the step S406 (S407). In general, data transfer between the cache memory 120 and the main storage 130 is conducted by taking a line as the unit. Therefore, the loading can be implemented by issuing a typical load instruction, and data in the main storage 130 is transferred to the cache memory 120.

The processing at the steps S406 and S407 is processing for conducting error recovery or error detection in the case where data in the data array 220 in the cache memory 120 retains error data. Concrete contents thereof will be described later.

If the validity bit 212 read out is not ON at the step S405, then the processing at the steps S406 and S407 is not conducted. This is because the corresponding entry in the directory array 210 is in an invalid state and valid data is not present and consequently error recovery is not required.

Subsequently, the error recovery module 141 updates contents of the index address information 301 (S408). A value after the update is set equal to a value of the index address corresponding to an entry located immediately behind an entry in the directory 210 corresponding to a current value of the index address information 301. If the current value is a value of the index address corresponding to the backmost (i.e., final) entry in the directory array 210, then a value after the update is set so as to lap over the value of the index address corresponding to the head entry in the directory array 210. This update processing makes it possible for the error recovery module 141 to conduct error recovery periodically from the head to the end of data in the data array 220 in the cache memory 120.

Subsequently, the error recovery module 141 provides the counter with +1 increment (S409). Subsequently, the error recovery module 141 makes a decision whether the counter value is less than a predetermined number of times (S410). If the counter value is less than the predetermined number, then the error recovery module 141 returns to the step S404 and repeats the processing at the step S404 and subsequent steps. If the counter value is not less than the predetermined number of times (i.e., if the counter value has reached the predetermined number of times), then the error recovery module 141 proceeds to subsequent processing.

The predetermined number of times is set to a value which minimizes the influence over the system performance in the virtual computer system. Since its concrete value partially depends upon the performance index required of the virtual computer system according to the present embodiment, a fixed value is not indicated. For example, however, a unit for setting the predetermined number of times is provided in the virtual computer control program 140 so as to be able to change the number of times easily and flexibly.

Subsequent processing corresponds to ending processing. First, the error recovery module 141 turns OFF the error recovery processing flag 302 (S411), then resumes the operation of the guest programs (S412), and finishes the error recovery processing of the cache memory 120.

The error recovery processing conducted by the error recovery module 141 and shown in FIG. 4 is intended for the cache memory 120 in the virtual computer system. However, it is also possible to apply the error recovery processing to the cache memory in the ordinary physical computer system which does not assume the configuration of a virtual computer.

Hereafter, the general processing image of the error recovery processing of the cache memory 120 conducted by the error recovery module 141 and shown in FIG. 4 will be described.

Figure 5:
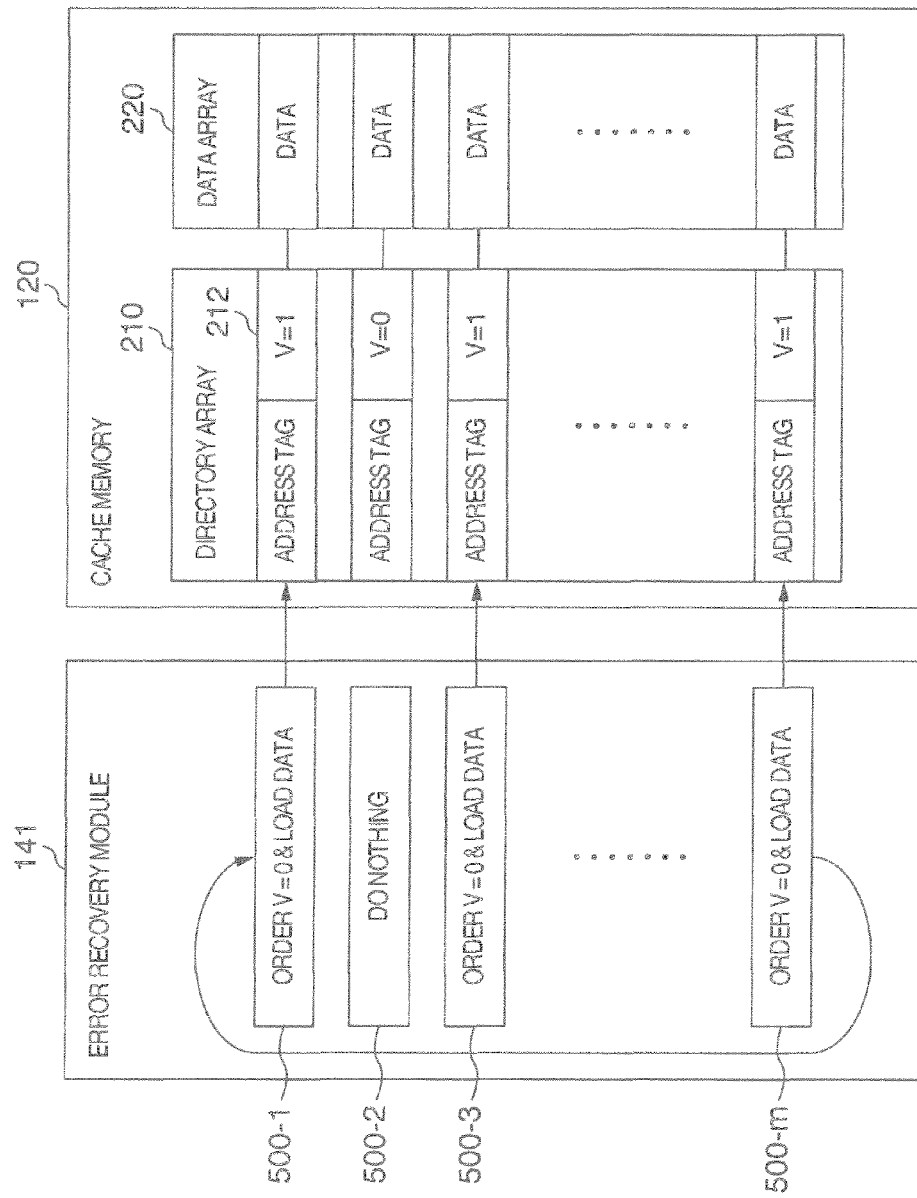
FIG. 5 is a diagram showing an outline of an example of processing conducted by an error recovery module in an embodiment of the present invention.

The error recovery module 141 is started at regular intervals under the control of the virtual computer control program 140. FIG. 5 is a diagram showing an outline of an example of processing conducted by the error recovery module 141. As for the validity bit 212 (V) in the directory array 210, it is supposed in FIG. 5 that V=1 indicates a valid state (ON) and V=1 indicates an invalid state (OFF) as an example.

The error recovery module 141 reads out the validity bit 212 of each entry in the directory array 210 successively from the head entry, and conducts processing according to the state indicated by the validity bit 212 read out. In FIG. 5, processing 500-1 indicates processing for the head entry in the directory array 210, and processing 500-2 indicates processing for the second entry in the directory array 210. Processing 500-3 indicates processing for the third entry, and processing 500-m indicates processing for the final entry.

The value of the validity bit 212 in each entry shown in FIG. 5 is nothing but one example. In the example shown in FIG. 5, V=1 (valid) in the head entry, the third entry and the final entry and V=0 (invalid) in the second entry.

The error recovery module 141 reads out the validity bit 212 of one entry in the directory array 210 (S404). If the validity bit 212 read out is V=1 (valid, N), then V=0 (invalid, OFF) is ordered (S406). Subsequently, the error recovery module 141 loads data corresponding to one line into the data part in the data array 220 corresponding to the pertinent entry (S407). In the example shown in FIG. 5, the processing 500-1, the processing 500-3 and the processing 500-m correspond thereto. If the validity bit 212 read out is V=0 (invalid, OFF), then any processing is not conducted on the pertinent entry. In the example shown in FIG. 5, the processing 500-2 corresponds thereto.

The error recovery module 141 conducts processing (the processing 500-m in the example shown in FIG. 5) on the final entry in the directory array 210, then reads out the validity bit 212 of the head entry again, and conducts processing according to the state indicated by the validity bit 212 read out. In this way, the error recovery module 141 conducts processing on all entries ranging from the head entry to the final entry in the directory successively and repeatedly. However, the error recovery module 141 does not repeat the above-described processing infinitely. At a time point where the processing has been repeated a predetermined number of times, the error recovery module 141 terminates the processing, and returns to a start source of the virtual computer control program 140. The outline of the error recovery processing of the cache memory 120 conducted by the error recovery module 141 has been described heretofore.

Details of the processing at the steps S406 and S407 in the flow chart of the processing conducted by the error recovery module 141 shown in FIG. 4 will now be described with reference to FIGS. 6 to 9. The processing at the steps S406 and S407 in FIG. 4 is processing tor conducting error recovery or error detection in the case where data in the data array 220 in the cache memory 120 retains error data.

Figure 6:
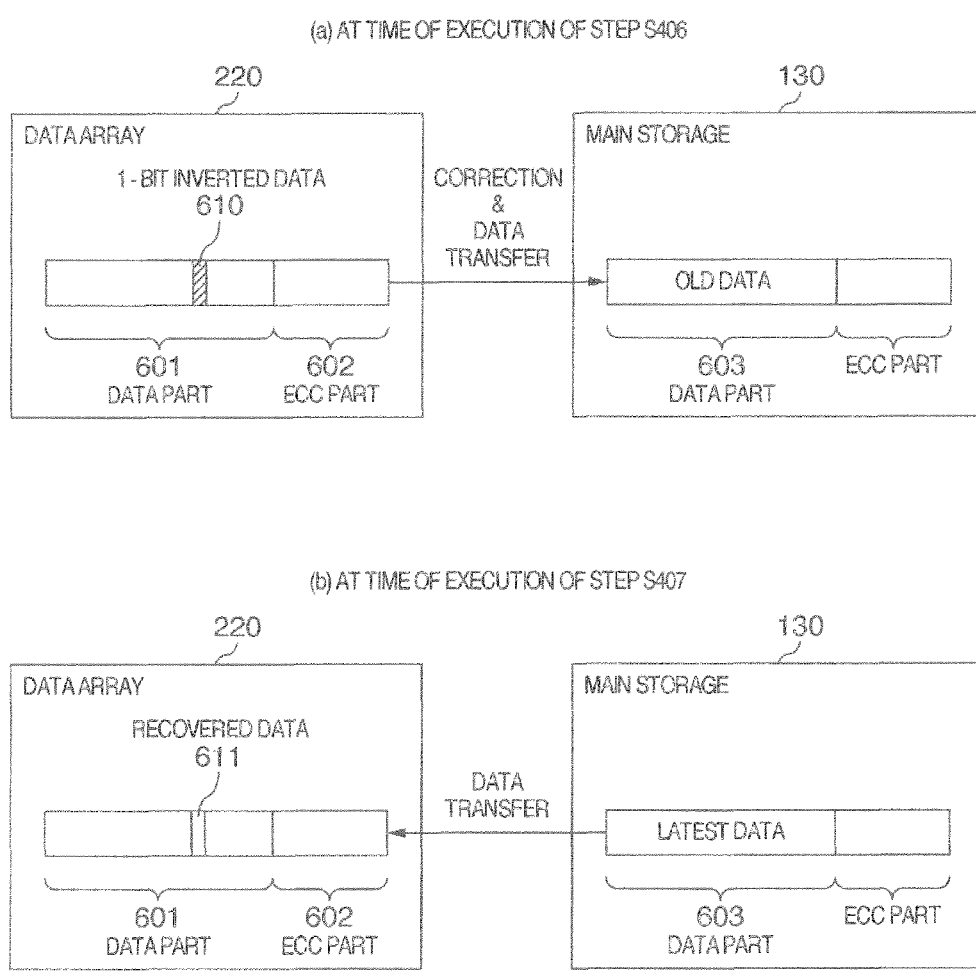
FIG. 6 shows diagrams for explaining an example of error recovery processing conducted by an error recovery module in an embodiment of the present invention.

FIG. 6 is a diagram for explaining an example of error recovery processing conducted by the error recovery module 141 in the case where only the cache memory 120 retains the latest data and the data in the cache memory 120 contains bit inverted data which can be corrected by hardware.

In the example shown in FIG. 6, an error which can be corrected by hardware is present. Therefore, it is premised that the data array 220 includes an ECC part 602 and one-bit inverted data 610 is present in a data part 601. However, the error may be an error which can be corrected by hardware other than the ECC.

A diagram (a) of FIG. 6 shows states at the time of execution of the step S406 in the flow chart shown in FIG. 4. At the step S406, the validity bit 212 of an entry in the directory array 210 corresponding to error data (data indicated by the data part 601 containing the one-bit inverted data 610) in the data array 220 is turned OFF (invalid). Data transfer from the cache memory 120 to the main storage 130 is conducted in order to assure that the latest data in the data part 601 is not lost by this invalidation. As a result, corresponding old data (a data part 603) in the main storage 130 is updated with the latest data.

In this transfer sequence, data obtained by correcting data taken out from the data part 601 in the data array 220 by using a value in the ECC part 602 is transferred to the main storage 130. Therefore, data subjected to the error correction having no bit inverted data is stored in the data part 603 in the main storage 130.

At this time point, however, the one-bit inverted data 610 remains left in the data part 601 in the data array 220. If this state is left as it is for a long time, occurrence of another one-bit inverted data results in a two-bit error which cannot be corrected by hardware. The processing at the step S407 in the flow chart shown in FIG. 4 is effective in avoiding such an error which cannot be corrected by hardware.

A diagram (b) of FIG. 6 shows states at the time of execution of the step S407 in the flow chart shown in FIG. 4. At the step S407, data is loaded in the error data (the data indicated by the data part 601 containing one-bit inverted data 610) in the data array 220 which corresponds to the entry in the directory array 210 invalidated at the step S406. As a result of this loading, data (the data part 603) in the main storage 130 is transferred to the data array 220, and the one-bit inverted data 610 in the data part 601 in the data array 220 is restored to correct data (recovered data 611).

FIG. 7 is a diagram for explaining an example of error recovery processing conducted by the error recovery module 141 in the case where both the cache memory 120 and the main storage 130 retain the latest data and the data in the cache memory 120 contains bit inverted data which can be corrected by hardware.

In the example shown in FIG. 7, an error which can be corrected by hardware is present in the same way as the example shown in FIG. 6. Therefore, it is premised that the data array 220 includes an ECC part 602 and one-bit inverted data 610 is present. However, the error may be an error which can be corrected by hardware other than the ECC.

A diagram (a) of FIG. 7 shows states at the time of execution of the step S406 in the flow chart shown in FIG. 4. At the step S406, the validity bit 212 of an entry in the directory array 210 corresponding to error data (data indicated by the data part 601 containing the one-bit inverted data 610) in the data array 220 is turned OFF (invalid). Even if this invalidation is conducted, data transfer from the cache memory 120 to the main storage 130 is not conducted, because the corresponding data (the data part 603) in the main storage 130 is the latest data. Therefore, the error data (the data indicated by the data part 601 containing the one-bit inverted data 610) in the data array 220 remains left.

A diagram (b) of FIG. 7 shows states at the time of execution of the step S407 in the flow chart shown in FIG. 4. At the step S407, data is loaded in the error data (the data indicated by the data part 601 containing the one-bit inverted data 610) in the data array 220 which corresponds to the entry in the directory array 210 invalidated at the step S406. As a result of this loading, data (the data part 603) in the main storage 130 is transferred to the data array 220, and the one-bit inverted data 610 in the data part 601 in the data array 220 is restored to correct data (recovered data 611).

FIG. 8 is a diagram for explaining an example of error recovery processing conducted by the error recovery module 141 in the case where both the cache memory 120 and the main storage 130 retain the latest data and the data in the cache memory 120 contains bit inverted data which cannot be corrected by hardware.

In the example shown in FIG. 8, an error which cannot be corrected by hardware is present. Therefore, it is premised that the data array 220 includes an ECC part 602 and two-bit inverted data 810 is present. However, the error may be an error which cannot be corrected by hardware other than the ECC.

A diagram (a) of FIG. 8 shows states at the time of execution of the step S406 in the flow chart shown in FIG. 4. At the step S406, the validity bit 212 of an entry in the directory array 210 corresponding to error data (data indicated by the data part 601 containing the two-bit inverted data 810) in the data array 220 is turned OFF (invalid). Even if this invalidation is conducted, data transfer from the cache memory 120 to the main storage 130 is not conducted, because the corresponding data (the data part 603) in the main storage 130 is the latest data. Therefore, the error data (the data indicated by the data part 601 containing the two-bit inverted data 810) in the data array 220 remains left.

A diagram (b) of FIG. 8 shows states at the time of execution of the step S407 in the flow chart shown in FIG. 4. At the step S407, data is loaded in the error data (the data indicated by the data part 601 containing the two-bit inverted data 810) in the data array 220 which corresponds to the entry in the directory array 210 invalidated at the step S406. As a result of this loading, data (the data part 603) in the main storage 130 is transferred to the data array 220, and the two-bit inverted data 810 in the data part 601 in the data array 220 is restored to correct data (recovered data 811).

FIG. 9 is a diagram for explaining an example of error recovery processing conducted by the error recovery module 141 in the case where only the cache memory 120 retains the latest data and the data in the cache memory 120 contains bit inverted data which cannot be corrected by hardware.

In the example shown in FIG. 9, an error which cannot be corrected by hardware is present in the same way as the example shown in FIG. 8. Therefore, it is premised that the data array 220 includes an ECC part 602 and the two-bit inverted data 810 is present. However, the error may be an error which cannot be corrected by hardware other than the ECC.

A diagram (a) of FIG. 9 shows states at the time of execution of the step S406 in the flow chart shown in FIG. 4. At the step S406, the validity bit 212 of an entry in the directory array 210 corresponding to error data (data indicated by the data part 601 containing the two-bit inverted data 810) in the data array 220 is turned OFF (invalid). Data transfer from the cache memory 120 to the main storage 130 is conducted in order to assure that the latest data in the data part 601 is not lost by this invalidation. As a result, corresponding old data (a data part 603) in the main storage 130 is updated with the latest data.

In this transfer sequence, it is attempted to correct data taken out from the data part 601 in the data array 220 by using a value of the ECC part 602. Since the two-bit inverted data 810 is contained, however, it is impossible to correct the data. Therefore, the error data (the data indicated by the data part 601 containing the two-bit inverted data 810) which remains uncorrected is transferred to the main storage 130. Therefore, data containing bit inverted data, i.e., data which is not subjected to error correction is stored in the data part 603 in the main storage 130.

A diagram (b) of FIG. 9 shows states at the time of execution of the step S407 in the flow chart shown in FIG. 4. At the step S407, it is attempted to load data in the error data (the data indicated by the data part 601 containing the two-bit inverted data 810) in the data array 220 which corresponds to the entry in the directory array 210 invalidated at the step S406. Since two-bit inverted data 910 is contained in data (the data part 603) in the main storage 130, however, a data transfer error is caused.

If a data transfer error caused by such an uncorrectable error has occurred in the data loading in the cache memory 120, software is typically notified of an interruption indicating an uncorrectable error. The virtual computer control program 140 has an interruption handling function in the virtual computer system, and calls the error interruption handler module 142 in response to an interruption indicating an uncorrectable error.

Figure 10:
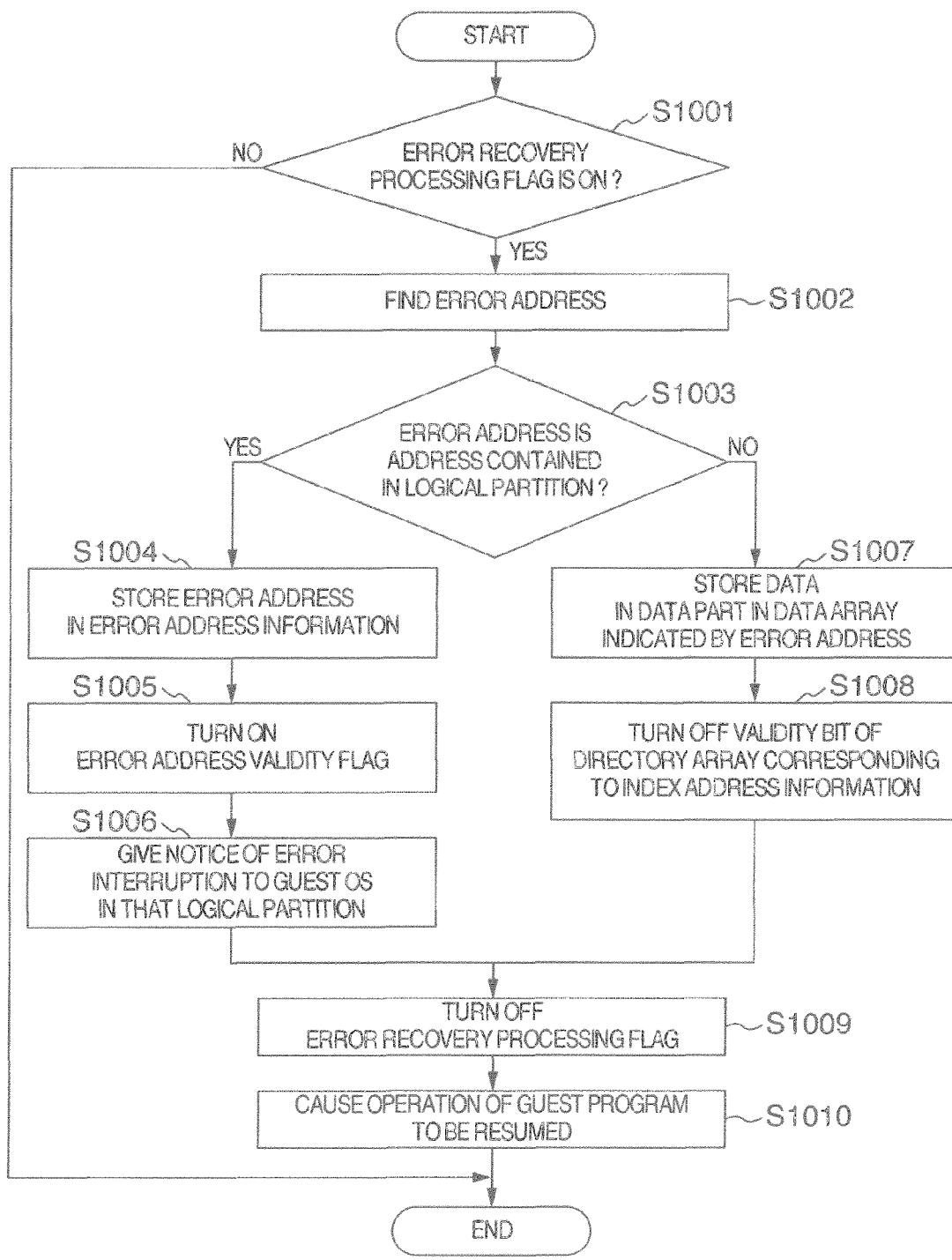
FIG. 10 is a flow chart showing an example of error interruption processing conducted by an error interruption handler module in an embodiment of the present invention.

Hereafter, processing conducted by the error interruption handler module 142 upon receiving an error interruption which indicates an uncorrectable error will be described. FIG. 10 is a flow chart showing an example of error interruption processing conducted by the error interruption handler module 142.

As for processing conducted by the error interruption handler module 142, the error interruption handler module 142 first makes a decision whether the error recovery processing flag 302 is ON (S1001). If the error recovery processing flag 302 is not ON, then the processing of the error interruption handler module 142 is finished and return to the interruption handling function of the virtual computer control program 140 which is the call source is conducted. If the error recovery processing flag 302 is ON, then processing for finding an error address in the cache memory 120 is conducted (S1002).

Figure 11:
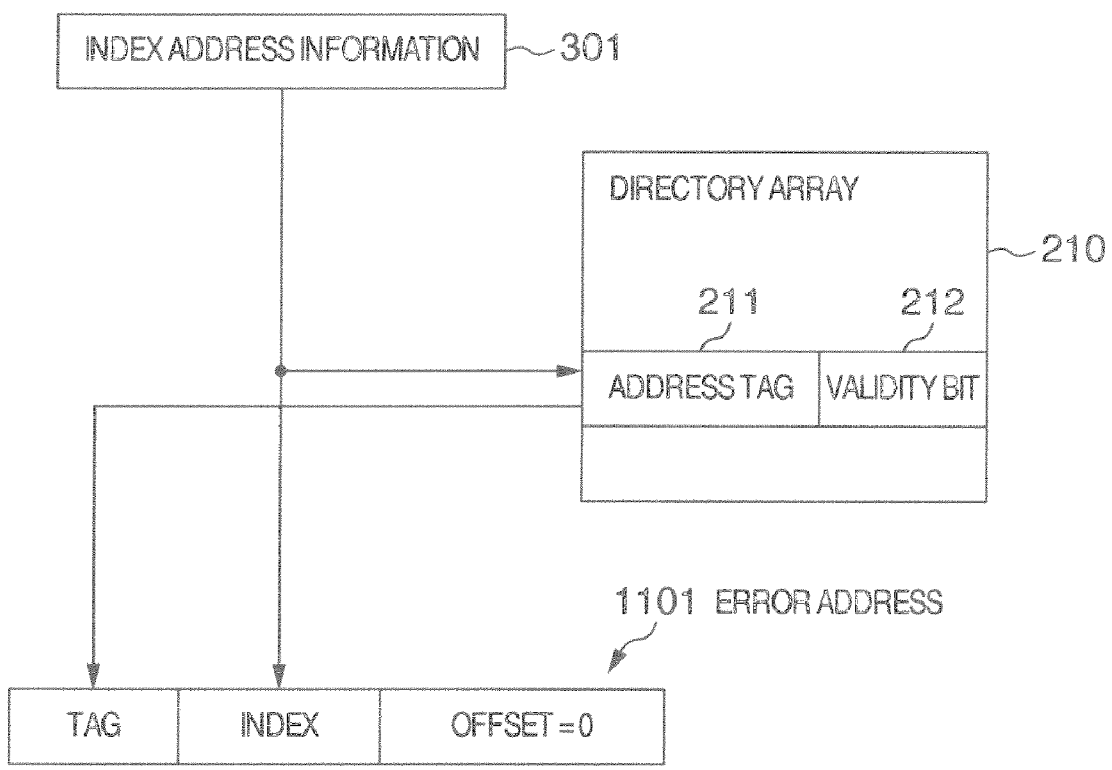
FIG. 11 is a diagram for explaining an example of a method for finding an error address in a cache memory in an embodiment of the present invention.

FIG. 11 is a diagram for explaining an example of a method for finding the error address in the cache memory. A value of a tag address in an error address 1101 ought to be equal to a value of the address tag 211 in an entry in the directory array 210 which corresponds to the index address retained in the index address information 301. Therefore, the value of the tag address of the error address 1101 is set equal to this value.

The value of the index address in the error address 1101 ought to be equal to the value of the index address retained in the index address information 301. Therefore, the value of the index address in the error address 1101 is set equal to the index address retained in the index address information 301. The value of the offset address in the error address 1101 is set equal to all 0 in order to specify the head offset in the line boundary. In this way, it is possible for the virtual computer control program 140 to find the error address 1101 in the cache memory 120 without requiring dedicated hardware.

After the error address 1101 is found at the step S1002 in the flow chart shown in FIG. 10, a decision is made whether the found error address 1101 is an address contained in an address region assigned to any logical partition 150 (S1003). If the error address 1101 is an address contained in the logical partition 150, then the error interruption handler module 142 stores the error address 1101 in the error address information 303 (S1004), and then turns the error address validity flag 304 ON (S1005).

Subsequently, the error interruption handler module 142 gives a notice of error interruption to the guest OS 151 operating in the logical partition 150 to which an address region containing the error address 1101 is assigned (S1006). As a result, the error recovery processing is entrusted to the guest OS 151. If the guest OS 151 is an OS which does not conduct the error recovery, however, it is possible to conduct error recovery in the error initialization module 144 in the virtual computer control program 140 which will be described later.

If the error address 1101 is an address which is not contained in the logical partition 150 at the step S1003, then data is stored in a data part in the data array 220 indicated by the error address 1101 (S1007). Since this storing is storing for error recovery, the data value to be stored may be an arbitrary value such as initialization data. Subsequently, the cache memory 120 is ordered to turn OFF (invalid) the validity bit 212 of an entry in the directory array 210 corresponding to the index address information 301 (S1008).

Owing to the processing at the steps S1007 and S1008, recovery is conducted from error data which cannot be corrected by hardware in the data array 220 in the cache memory 120 and the main storage 130 in the example shown in FIG. 9. Details of this processing will be described later.

Thereafter, the error recovery processing flag 302 is turned OFF no matter whether the error address 1101 is contained in the logical partition 150 (S1009). As a result, preparations are ready for correctly making a decision whether the error recovery module 141 is conducting processing when the error interruption handler module 142 is next called. Subsequently, the error interruption handler module 142 causes the operation of the guest programs stopped by the error recovery module 141 to resume (S1010), and terminates processing conducted by it as the error interruption handler module 142. Heretofore, processing conducted by the error interruption handler module 142 has been described.

Hereafter, processing for conducting error recovery in the error data initialization module 144 will be described. At the step S1006 in FIG. 10, the error interruption handler module 142 gives a notice of error interruption to the guest OS 151 operating in the logical partition 150 to which an address region containing the error address 1101 is assigned. If the guest OS151 which has received the interruption notice is an OS which does not conduct error recovery at this time, then the error remains left. In many cases, the guest program which operates in the pertinent logical partition 150 because of this error selects shutdown or restart of the logical partition 150 (logical computer).

As described above, the virtual computer control program 140 is a program which logically divides hardware resources (computer resources) of the physical computer 100 and manages resultant partitions as logical partitions 150. The virtual computer control program 140 logically divides computer resources such as the CPU 110 and the main storage 130 in the physical computer 100 and assigns the resources thus obtained by division as the logical partitions 150.

At the time of shutdown or restart of the logical partition 150 (logical computer), the virtual computer control program 140 opens the main storage 130 divided and assigned to the object logical partition 150. After this opening, the virtual computer control program 140 executes the error data initialization module 144. Only in the case of the restart of the logical partition 150 (logical computer), the virtual computer control program 140 executes the error data initialization module 144, then divides the main storage 130 and reassigns a division of the main storage 130 to the object logical partition 150.

Figure 12:
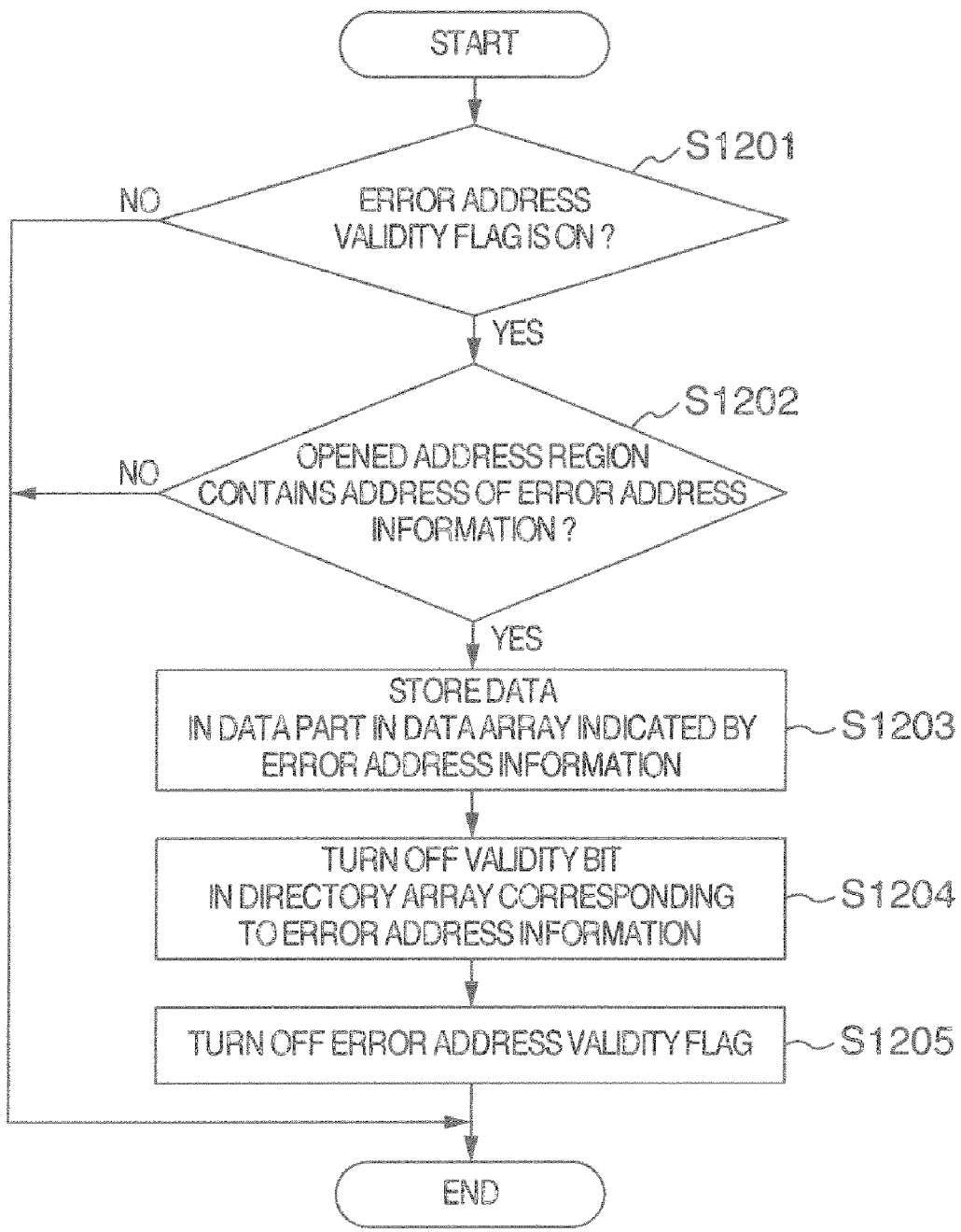
FIG. 12 is a flow chart showing an example of error data initialization processing conducted by an error data initialization module in an embodiment of the present invention.

FIG. 12 is a flow chart showing an example of the error data initialization processing conducted by the error data initialization module 144. The error data initialization module 144 first makes a decision whether the error address validity flag 304 is ON (S1201). If the error address validity flag 304 is not ON, then the processing of the error data initialization module 144 is finished.

If the error address validity flag 304 is ON, then a decision is made whether the address region opened in the object logical partition 150 is a region containing an address of the error address information 303 (S1202). If the opened address region is a region which does not contain the address of the error address information 303, then the processing of the error data initialization module 144 is finished.

If the opened address region is a region which contains the address of the error address information 303, then data is stored in a data part in the data array 220 indicated by the error address information 303 (S1203). Since this storing is storing for error recovery, the data value to be stored may be an arbitrary value such as initialization data. Subsequently, the cache memory 120 is ordered to turn OFF (invalid) the validity bit 212 of an entry in the directory array 210 corresponding to the index address in the error address information 303 (S1204).

Owing to the processing at the steps S1203 and S1204, recovery is conducted from error data which cannot be corrected by hardware in the data array 220 in the cache memory 120 and the main storage 130 in the example shown in FIG. 9. Details of this processing will be described later. Thereafter, the error address validity flag 304 is turned OFF (S1205). As a result, preparations are ready for correctly making a decision whether information of the error address information 303 is valid when the error data initialization module 144 is next called. The processing of the error data initialization module 144 is thus finished.

Processing for recovery from error data which cannot be corrected by hardware in the data array 220 in the cache memory 120 and the main storage 130 in the example shown in FIG. 9 by conducting processing at the steps S1007 and S1008 in the flow chart shown in FIG. 10 or processing at the steps S1203 and S1204 shown in FIG. 12 will now be described with reference to FIG. 13.

FIG. 13 is a continuation of the example of the above-described states of the cache memory 120 and the main storage 130 shown in FIG. 9. FIG. 13 is a diagram for explaining an example of error recovery processing conducted by the error recovery module 141 in the case where only the cache memory 120 retains the latest data and data in the cache memory 120 contains bit inverted data which cannot be corrected by hardware.

In the example shown in FIG. 13, an error which cannot be corrected by hardware is present in the same way as the example shown in FIG. 9. Therefore, it is premised that the data array 220 includes the ECC part 602 and the two-bit inverted data 810 is present. However, the error may be an error which cannot be corrected by hardware other than the ECC.

The diagram (a) of FIG. 13 is the same diagram as that shown in (b) of FIG. 9. States at the time of execution of the step S407 in the flow chart shown in FIG. 4 are shown in (a) of FIG. 13.

The diagram (b) of FIG. 13 shows states at the time of execution of the step S1007 in the flow chart shown in FIG. 10 or the step S1203 in the flow chart shown in FIG. 12. At the step 1007 or the step S1203, data storing is executed and error data in the data array 220 (data indicated by the data part 601 containing the two-bit inverted data 810) is overwritten with initialization data 1301. An ECC of the initialization data 1301 is generated and the ECC is stored in the ECC part 602 in the data array 220 by this data storing.

As a result, each of values in the data part 601 and the ECC part 602 in the data array 220 becomes an errorless value and an uncorrectable error is removed by the initialization data 1301. Data in the data array 220 becomes the latest data as a result of this storing.

The diagram (c) of FIG. 13 shows states at the time of execution of the step S1008 in the flow chart shown in FIG. 10 or the step S1204 in the flow chart shown in FIG. 12. At the step 1008 or the step S1204, the validity bit 212 of an entry in the directory array 210 corresponding to recovered data (data indicated by the data part 601 containing recovery initialization data 1302) in the data array 220 is turned OFF (invalid). Data transfer from the cache memory 120 to the main storage 130 is conducted in order to assure that the latest data in the data part 601 is not lost by this invalidation. As a result, corresponding data in the main storage 130 is updated with the latest data.

In this transfer sequence, data having no bit inverted data in the data array 220 is transferred to the main storage 130. Therefore, data having no bit inverted data (data containing recovery initialization data 1303) is stored in the data part 603 in the main storage 130 and uncorrectable error is removed from the data part 603 in the main storage 130 as well.

In the case of the examples shown in FIGS. 6 to 8, the virtual computer system according to the present embodiment makes it possible to recover from a cache memory error without any influence of the error and operate the system continuously for a long time as heretofore described. In the case of the example shown in FIG. 9, there is a possibility that partial logical partitions 150 will shut down if recovery from the error conducted by the guest OS 151 cannot be expected. In such a case as well, however, it is possible to restrict the shutdown to temporary shutdown because error recovery is conducted. Furthermore, since the whole system is not brought into shutdown, it is possible to prevent system shutdown even if the cache memory error of the example shown in FIG. 9 is caused.

According to the virtual computer system according to the present embodiment, it is thus possible to provide a high reliability system which makes possible long time continuous operation even if a cache memory error has occurred. Furthermore, it is possible to provide a low-cost secure cache memory error recovery function without needing to add hardware and mount an error recovery unit on a guest program, by providing an error recovery function for the cache memory 120 in the virtual computer control program 140.

Heretofore, the invention made by the inventor has described concretely with reference to the embodiment. However, the present invention is not restricted to the embodiment. As a matter of course, various changes can be made on the present invention without departing from its spirit.

The present invention can be utilized in a virtual computer system having a virtual computer control program which constitutes a plurality of logical partitions in a single physical computer.

The invention claimed is:

1. A virtual computer system for executing a virtual computer control program on a physical computer to divide the physical computer into a plurality of logical partitions, assign computer resources of the physical computer to the logical partitions and control the computer resources, and thereby causing guest programs respectively including guest OSs to operate on the logical partitions, respectively, the virtual computer system comprising one or more computer-readable media with computer-readable program code embodied therein for the virtual computer control program comprising:

an error recovery module for periodically conducting error recovery processing to recover from an error in a cache memory in the physical computer, comprising computer-readable code that when executed causes the physical computer to perform the following steps of:
  stopping one of the guest programs operating on one of the logical partitions;
  with respect to each entry in the cache memory in the physical computer, invalidating the entry if the entry is valid;
  reloading the invalidated entry with data from a main storage in the physical computer to recover from an error in the cache memory; and
  resuming operation of the guest program on the logical partition;

an error interruption handler module responsive to an interruption notice caused by an error which has occurred in the cache memory, for conducting error interruption processing to recover from an error in the cache memory, comprising computer-readable code, that when executed, cause the physical computer to perform the following steps if the virtual computer control program receives a notice of error interruption caused by an uncorrectable error in the cache memory when reloading the object entry in the cache memory with data from the main storage in the physical computer to recover from an error in the cache memory, the virtual computer control program executes the error interruption processing comprising:
  finding an error address which is an address of the entry in the cache memory in which the uncorrectable error has occurred;
  making a decision whether the error address is included in an address region assigned to any one of the logical partitions;
  giving a notice of error interruption to one of the guest OSs operating on the pertinent logical partition if the decision is true;
  recovering from the error in the cache memory by storing initialization data in the entry corresponding to the error address if the decision is false; and
  reflecting data in the cache memory to the main storage by invalidating the entry corresponding to the error address; and an error data initialization module for conducting error data initialization processing to recover from an error in the cache memory with shutdown or restart of one of the logical partitions as a momentum, wherein the recovery processing from an error in the cache memory is conducted independently of operations of the guest programs operating on the logical partitions.

2. An error recovery method in a virtual computer system for executing a virtual computer control program on a physical computer to divide the physical computer to a plurality of logical partitions, assign computer resources of the physical computer to the logical partitions and control the computer resources, and thereby causing guest programs respectively including guest OSs to operate on the logical partitions, respectively, wherein the physical computer executes the virtual computer control program to execute error recovery processing comprising the steps of:
  stopping one of the guest programs operating on one of the logical partitions;
  with respect to each entry in the cache memory in the physical computer, invalidating the entry if the entry is valid;
  reloading the invalidated entry with data from a main storage in the physical computer to recover from an error in the cache memory; and
  resuming operation of the guest program on the logical partition; and if the virtual computer control program receives a notice of error interruption caused by an uncorrectable error in the cache memory when reloading the object entry in the cache memory with data from the main storage in the physical computer to recover from an error in the cache memory, the virtual computer control program executes error interruption processing comprising the steps of:
  finding an error address which is an address of the entry in the cache memory in which the uncorrectable error has occurred;
  making a decision whether the error address is included in an address region assigned to any one of the logical partitions;
  giving a notice of error interruption to one of the guest OSs operating on the pertinent logical partition if the decision is true;
  recovering from the error in the cache memory by storing initialization data in the entry corresponding to the error address if the decision is false; and
  reflecting data in the cache memory to the main storage by invalidating the entry corresponding to the error address.

3. The error recovery method in virtual computer according to claim 2, wherein with shutdown or restart of the logical partition including the error address as a momentum, the virtual computer control program executes error data initialization processing comprising the steps of:
  recovering from the error in the cache memory by storing initialization data in the entry corresponding to the error address; and
  reflecting data in the cache memory to the main storage by invalidating the entry corresponding to the error address.

4. A virtual computer control program executed on a physical computer to divide the physical computer into a plurality of logical partitions, assign computer resources of the physical computer to the logical partitions and control the computer resources and thereby cause the physical computer to function as a virtual computer system which operate guest programs respectively including guest OSs on the logical partitions respectively, comprising one or more computer-readable media with program code embodied therein for the virtual computer control program that when executed by the physical computer executes error recovery processing comprising the steps of:
  stopping one of the guest programs operating on one of the logical partitions;
  with respect to each entry in the cache memory in the physical computer, invalidating the entry if the entry is valid;

reloading the invalidated entry with data from a main storage in the physical computer to recover from an error in the cache memory; and resuming operation of the guest program on the logical partition; and wherein upon receiving a notice of error interruption caused by an uncorrectable error in the cache memory when reloading the object entry in the cache memory with data from the main storage in the physical computer to recover from an error in the cache memory, the virtual computer control program executing error interruption processing comprising the steps of:

finding an error address which is an address of the entry in the cache memory in which the uncorrectable error has occurred;

making a decision whether the error address is included in an address region assigned to any one of the logical partitions;

giving a notice of error interruption to one of the guest OSs operating on the pertinent logical partition if the decision is true;

recovering from the error in the cache memory by storing initialization data in the entry corresponding to the error address if the decision is false; and reflecting data in the cache memory to the main storage by invalidating the entry corresponding to the error address.

5. The virtual computer control program according to claim 4, wherein with shutdown or restart of the logical partition including the error address as a momentum, the virtual computer control program executes error data initialization processing comprising the steps of:

recovering from the error in the cache memory by storing initialization data in the entry corresponding to the error address; and reflecting data in the cache memory to the main storage by invalidating the entry corresponding to the error address.

* * * * *